US009120513B2

(12) United States Patent
Lee et al.

(10) Patent No.: US 9,120,513 B2
(45) Date of Patent: Sep. 1, 2015

(54) METHOD OF CONTROLLING GAIT OF ROBOT

(71) Applicant: Hyundai Motor Company, Seoul (KR)

(72) Inventors: Seok Won Lee, Chungcheongnam-do (KR); Woo Sung Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 146 days.

(21) Appl. No.: 13/844,740

(22) Filed: Mar. 15, 2013

(65) Prior Publication Data

US 2014/0172168 A1 Jun. 19, 2014

(30) Foreign Application Priority Data

Dec. 17, 2012 (KR) ........................ 10-2012-0147880

(51) Int. Cl.
 *B62D 57/032* (2006.01)
 *B25J 13/08* (2006.01)

(52) U.S. Cl.
 CPC ............... *B62D 57/032* (2013.01); *B25J 13/08* (2013.01); *Y10S 901/01* (2013.01)

(58) Field of Classification Search
 CPC .................................. B25J 5/00; G06F 19/00
 USPC ................................................ 700/245, 260
 See application file for complete search history.

(56) References Cited

U.S. PATENT DOCUMENTS

| 7,628,766 | B1 * | 12/2009 | Kazerooni et al. ............... 602/16 |
| 2004/0181312 | A1 * | 9/2004 | Miura et al. .................. 700/258 |
| 2005/0173164 | A1 * | 8/2005 | Maslov et al. .................. 180/8.1 |
| 2006/0143645 | A1 * | 6/2006 | Vock et al. ......................... 725/9 |
| 2007/0118328 | A1 * | 5/2007 | Vock et al. ..................... 702/160 |
| 2008/0065269 | A1 * | 3/2008 | Hasegawa ....................... 700/260 |
| 2008/0297091 | A1 * | 12/2008 | Park et al. ................. 318/568.12 |
| 2009/0210093 | A1 * | 8/2009 | Jacobsen et al. .............. 700/260 |
| 2009/0308668 | A1 * | 12/2009 | Roh et al. ......................... 180/8.6 |
| 2010/0042256 | A1 * | 2/2010 | Takenaka et al. .............. 700/245 |
| 2010/0076720 | A1 * | 3/2010 | Mori et al. ..................... 702/150 |
| 2011/0098860 | A1 * | 4/2011 | Yoshiike et al. .............. 700/260 |
| 2011/0105966 | A1 * | 5/2011 | Kazerooni et al. ............... 601/35 |
| 2011/0172817 | A1 * | 7/2011 | Park et al. ..................... 700/245 |
| 2011/0264016 | A1 * | 10/2011 | Han et al. ......................... 601/35 |
| 2011/0264264 | A1 * | 10/2011 | Shirokura et al. ............ 700/245 |

FOREIGN PATENT DOCUMENTS

| KR | 10-0841177 B1 | 6/2008 |
| KR | 10-2011-0073168 A | 6/2011 |
| KR | 10-2011-0084632 A | 7/2011 |
| KR | 2011-0083144 A | 7/2011 |
| KR | 10-2012-0069333 A | 6/2012 |
| KR | 10-2012-0071555 A | 7/2012 |

* cited by examiner

*Primary Examiner* — Jerrah Edwards
*Assistant Examiner* — Tamara Weber
(74) *Attorney, Agent, or Firm* — McDermott Will & Emery LLP

(57) ABSTRACT

A method of controlling the gait of a wearable robot using foot sensors of the robot. Whether or not the robot is walking is determined. When the robot is walking, whether the robot is supported on both feet or one foot using the foot sensors is determined. When the robot is walking and is supported on both feet, posture-maintaining control is carried out. When the robot is walking and is supported on one foot, support control is carried out over a supporting leg based on gravity compensation and load compensation. When the robot is walking and is supported on one foot, an imaginary repulsive force by which a swinging leg swings is generated.

4 Claims, 3 Drawing Sheets

METHOD OF CONTROLLING GAIT OF ROBOT

BACKGROUND OF THE DISCLOSURE

1. Field of the Disclosure

The present disclosure relates, in general, to a method of controlling the gait of a wearable robot by which a variety of control algorithms are applicable depending on respective states of the wearable robot, so that a wearer can feel a sense of stability and an effect of reduced weight.

2. Description of the Related Art

The present disclosure relates to a gait control algorithm which assists the gait of a wearer whose wearing lower limbs of a wearable robot including an object having an unknown weight.

The wearable robot can be in a standing erect state and a walking state.

Therefore, it is required to maintain the posture of the robot having an unknown weight in an initial standing erect state, and respective control algorithms for a support leg and a swinging leg are required in the walking state.

In the related art, a technology was disclosed by KR 10-1179159 B1 "FOOT SENSOR DEVICE OF WEARABLE ROBOT AND METHOD OF UNDERSTANDING INTENTION OF GAIT OF WEARER." In this document, a foot sensor device includes a first sensor disposed in an area of the upper surface of a foot member of the wearable robot where toes of a foot of a wearer are positioned, a second sensor disposed in an area of the upper surface of the foot member where the ball of the foot of the wearer is positioned, a third sensor disposed in an area of the upper surface of the foot member where the heel of the foot of the wearer is positioned, and a controller which determines the intention of the gait of the wearer based on signals from the first to third sensors. The first to third sensors turn on when a load is applied thereto and turn off when no load is applied thereto. The controller determines that the foot of the wearer is off the ground when all of the first to third sensors are off, determines that the wearer is in a plantar-flexion state when the first sensor is on and the second and third sensors are off, determines that the wearer is in a heel strike state when the first and second sensors are off and the third sensor is on, and determines that the wearer is standing with the entire sole of the foot attached to the foot member when each of the first to third sensors is on.

The present disclosure proposes a gait control algorithm which can minimize the number of sensors used for controlling the gait of a wearable robot.

The information disclosed in the Background of the Disclosure section is only for enhancing the understanding of the background of the present disclosure, and should not be taken as an acknowledgment or any form of suggestion that this information forms prior art that would already be known to a person having ordinary skill in the art.

Patent Document 1: KR 10-1179159 B1

SUMMARY OF THE DISCLOSURE

The present disclosure proposes a method of controlling the gait of a wearable robot by which various types of control algorithms depending on respective states of the wearable robot are applicable so that a wearer can feel a sense of stability and an effect of reduced weight.

According to one aspect of the present disclosure, there is provided a method of controlling the gait of a wearable robot using foot sensors of the robot. The method includes the following steps of: determining whether or not the robot is walking; when it is determined the robot is walking, determining whether the robot is supported on both feet or one foot using the foot sensors; when it is determined the robot is walking and is supported on both feet, carrying out posture-maintaining control; when it is determined the robot is walking and is supported on one foot, carrying out support control over a supporting leg based on gravity compensation and load compensation; and when it is determined the robot is walking and is supported on one foot, generating an imaginary repulsive force by which a swinging leg swings.

In an exemplary embodiment, the step of determining whether or not the robot is walking may be carried out using the foot sensors of the robot or encoders on joints of the robot.

In an exemplary embodiment, the step of determining whether or not the robot is walking may include carrying out posture-maintaining control when it is determined the robot is not walking.

In an exemplary embodiment, the step of carrying out the support control may include determining a walking speed using the foot sensors on the supporting leg.

In an exemplary embodiment, the step of generating the imaginary repulsive force may include rapidly controlling the stride or a moving speed of a tip of toes of the foot depending on the walking speed determined at the step of carrying out the support control.

In an exemplary embodiment, the step of generating the imaginary repulsive force may include generating the imaginary repulsive force at a moment that the foot of the swinging leg leaves the ground.

In an exemplary embodiment, the generated imaginary repulsive force may be a cosine function, with a magnitude thereof gradually decreasing from a maximum value when the repulsive force is applied.

In an exemplary embodiment, the foot sensors may include a plurality of sensing elements which are continuously arranged in the lengthwise direction of the foot.

According to the method of controlling the gait of a wearable robot having the above-described configuration, the posture of the robot can be converted by measuring the weight of an added load and the height of the robot in an erected state. The posture of the wearer in the initial state can also be maintained depending on the outer shape of the wearer, and the wearer can be provided with a good sense of wearing.

An algorithm that determines the gait using the foot sensors can have an initial role when selectively inputting a control algorithm that differs depending on the state of the robot; that is, supported on both feet (both feet support state) or one foot (one foot support state).

In addition, the supporting leg control algorithm in the one foot support state calculates the weight of the robot and the wearer, and the unknown weight of the load, and at the same time, calculates the walking speed using information generated from the foot sensors on the sole of the foot.

A swinging leg control algorithm in the one foot support state is a control algorithm that controls the forward gait of the robot, and can assist the swinging of the robot in order to generate an imaginary repulsive force and can control the gait.

In addition, the posture control algorithm in the both feet support state can maintain posture in the both feet support state when the wearable robot operates.

As set forth above, a variety of control algorithms is applicable depending on the respective states of the wearable robot so that the wearer can feel a sense of stability and an effect of reduced weight.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE DISCLOSURE

Figure 1:
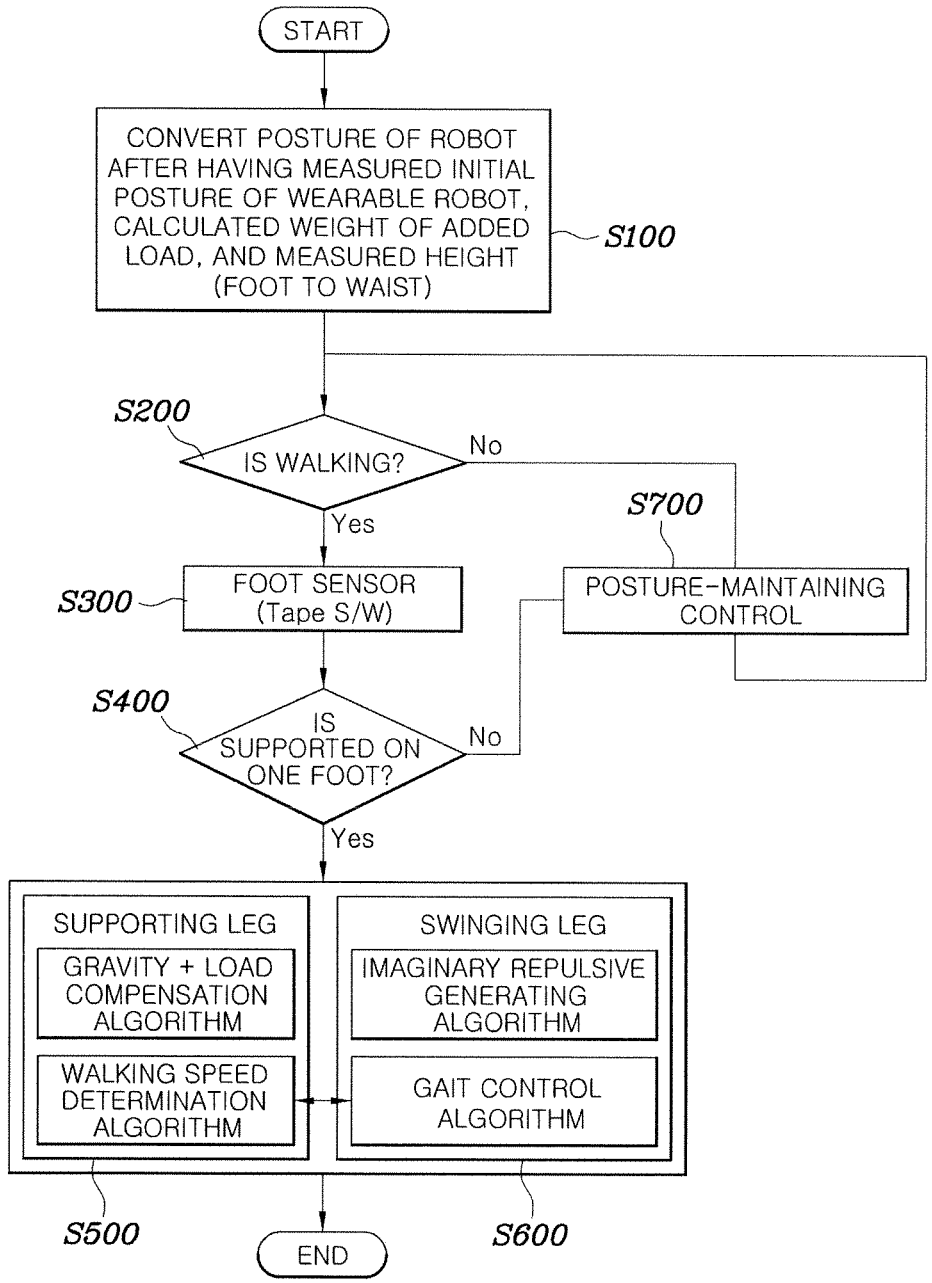
FIG. 1 is a flowchart showing a method of controlling the gait of a wearable robot according to an exemplary embodiment of the present disclosure.

Reference will now be made in greater detail to a method of controlling the gait of a wearable robot according to a preferred embodiment of the present disclosure, an example of which is illustrated in the accompanying drawings. Wherever possible, the same reference numerals will be used throughout the drawings and the description to refer to the same or like parts.

Figure 2:
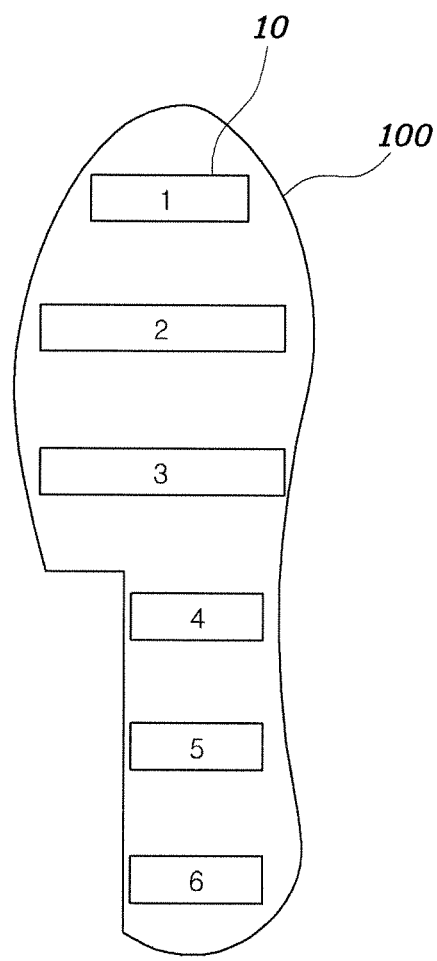
FIG. 2 is a view illustrating foot sensors which are used in the method of controlling the gait of a wearable robot according to an exemplary embodiment of the present disclosure.
Figure 3:
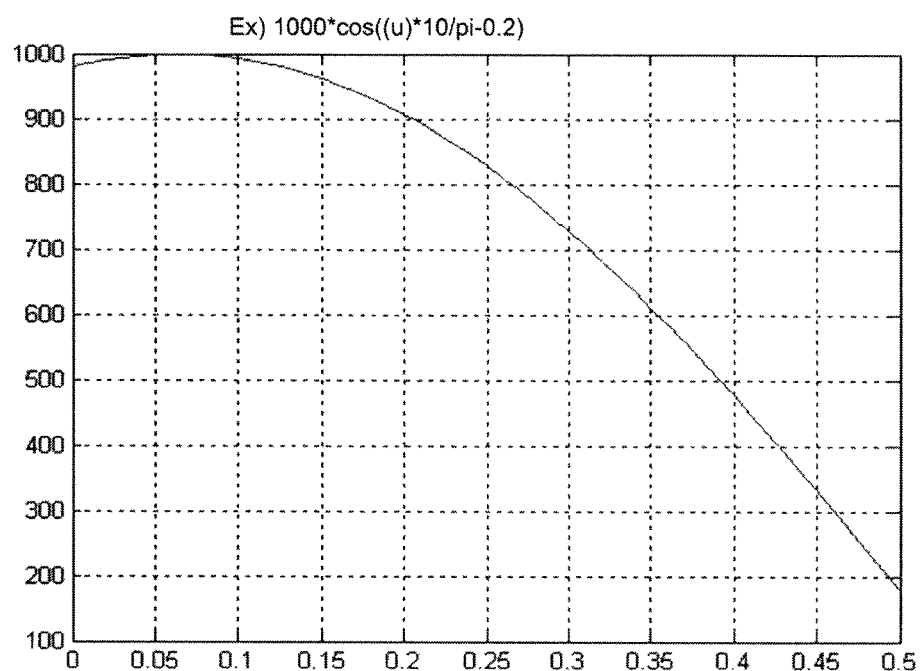
FIG. 3 is a graph showing variations in an imaginary repulsive force in the execution of the method of controlling the gait of a wearable robot according to an exemplary embodiment of the present disclosure.

FIG. 1 is a flowchart showing a method of controlling the gait of a wearable robot according to an exemplary embodiment of the present disclosure, FIG. 2 is a view illustrating foot sensors which can be used in the method of controlling the gait of a wearable robot according to an exemplary embodiment of the present disclosure, and FIG. 3 is a graph showing variations in an imaginary repulsive force in the execution of the method of controlling the gait of a wearable robot according to an exemplary embodiment of the present disclosure.

An exemplary method of controlling the gait of a wearable robot according to the present disclosure can change the posture of the robot by measuring a weight of an added load and the height of the robot in the erect state. The method can also maintain the posture of the wearer in an initial state depending on an outer shape of the wearer and provide the wearer with a good sense of wearing.

In addition, an algorithm that determines the gait using foot sensors can have an initial role when selectively inputting a control algorithm that differs depending on the state of the robot; that is, supported on both feet (both feet support state) or on one foot (one foot support state).

A supporting leg control algorithm in the one foot support state calculates the weight of the robot and the wearer, and the unknown weight of the load, and at the same time, calculates the walking speed using information generated from the foot sensors on the sole of the foot.

A swinging leg control algorithm in the one foot support state is a control algorithm that controls the forward gait of the robot, and can help the robot swing in order to generate an imaginary repulsive force and can control the gait.

Consequently, a posture control algorithm in the both feet support state can maintain posture in the both feet support state when the wearable robot operates.

Accordingly, a method of controlling the gait of a wearable robot according to the present disclosure can use foot sensors of the robot, and can be applied to a wearable robot which includes foot sensors attached thereto.

When the robot is used at an industrial site for carrying a load, a balanced gait is required for the wearer wearing the robot. The initial balancing is carried out for control of the balanced gait. Consequently, after the posture of the robot is mechanically examined using motor encoders respectively provided on joints, when a load is held, gravity compensation is performed by adding the weight of the load so that the robot can still have a stable posture.

In addition, a height from foot to waist in the basic posture of the robot is measured (e.g., included in s100 in FIG. 1), and control over the gait can be carried out so that this height can be maintained when walking.

Then, a determination step S200 of determining whether or not the robot is walking is carried out. At the determination step S200, it is determined whether or not the robot is walking based on detections by the foot sensors of the robot or using encoders on the joints of the robot.

When it is determined the robot is not walking as a result of the determination step S200, a posture-maintaining control step s700 is carried out. In the posture-maintaining control step s700, motors of the joints are controlled such that the torque thereof stays uniform so that balancing can be achieved in a state in which the robot is stationary.

When it is determined the robot is walking (e.g., by a foot sensor at s300), a discrimination step S400 of determining whether the robot is supported on both feet or one foot using the foot sensors is carried out.

FIG. 2 is a view illustrating foot sensors which are used in the method of controlling the gait of a wearable robot according to an exemplary embodiment of the present disclosure. The foot sensors can be configured as a plurality of sensing elements which are continuously arranged in a lengthwise direction of each foot. The foot sensors can determine whether or not the robot is walking, whether or not the robot is supported on both feet or one foot, and the walking speed of the robot depending on the sequence or the speed of measurement of the plurality of sensing elements.

Consequently, whether the robot is supported on both feet or one foot can be determined using the foot sensors. While walking, at the moment the left foot of the robot leaves the ground, the right foot supports the robot and the left leg begins to swing. Then, at the moment that the left foot touches the ground, the robot is supported on both feet. Thereafter, the right foot leaves the ground so that the left foot supports the robot and the right leg begins to swing.

Therefore, while walking, for the relatively short period of time when both feet support the robot, the posture-maintaining control step s700 can be carried out. At the moment that one foot leaves the ground, a one-foot balance control can be carried out in order to generate a repulsive force that helps one leg rise while controlling the other foot to support the robot.

Therefore, when the robot is walking and is supported on both feet, the posture-maintaining control step s700 can be carried out (i.e., both feet support step). That is, at the moment that both the left and right foot are on the ground, the robot is regarded as being supported on both feet, and thus the posture-maintaining control is carried out.

In addition, when the robot is walking and is supported on one foot, support control can be carried out over a supporting leg based on gravity compensation and load compensation at a support step S500. That is, since the support leg must balance the robot on one foot, the posture is basically maintained via gravity compensation, and when a load is applied, the weight of the load is also considered when controlling the posture.

In addition, when the robot is walking and is supported on one foot, an imaginary repulsive force by which the swinging leg swings is generated at a swinging step S600. That is, at the moment that the foot of the swinging leg leaves the ground, the imaginary repulsive force is generated.

Furthermore, at the support step S500, it is possible to determine the walking speed using the foot sensors on the supporting leg.

Moreover, at the swinging step S600, it is possible to control the walking speed so as to increase or decrease the moving speed of the tip of the toes depending on the walking speed that has been determined at the support step.

Specifically, while the support control is carried out over the supporting leg, the speed and state of the foot from the moment the foot touches the ground to the moment the foot leaves the ground are examined by observing the movement of the leg. Consequently, the walking speed is estimated, and the gait control is carried out so as to change the length of the stride or rapidly change the moving speed of the tiptoe depending on the walking speed.

In addition, the swinging step S600 generates the imaginary repulsive force at the moment the foot of the swinging leg leaves the ground. Specifically, the leg of the supporting foot is converted into the swinging leg at the moment the foot leaves the ground as the robot walks. When the joint is driven at that moment in which a repulsive force is generated, the wearer can easily raise and swing the swinging leg. Therefore, in this case, the joint of the swinging leg is controlled so that it generates the imaginary repulsive force at the moment that the foot leaves the ground.

In addition, the magnitude of the imaginary repulsive force generated at the swinging step S600 can be generated as a cosine function such that it gradually decreases from a maximum valve.

FIG. 3 is a graph showing variations in an imaginary repulsive force in the execution of the method of controlling the gait of a wearable robot according to an exemplary embodiment of the present disclosure. As shown in FIG. 3, since the repulsive force is generated depending on the cosine function having a preset period and a shifting value, the repulsive force gradually increases at the initial stage, and then gradually decreases until it is extinguished. In this case, it is possible to help the robot naturally walk.

According to the present disclosure as set forth above, a variety of control algorithms are applicable depending on the respective states of the wearable robot so that the wearer can feel a sense of stability and an effect of reduced weight.

Although the exemplary embodiments of the present disclosure have been described for illustrative purposes, those skilled in the art will appreciate that various modifications, additions and substitutions are possible, without departing from the scope and spirit of the accompanying claims.

What is claimed is:

1. A method of controlling the gait of a wearable robot, comprising:
    determining whether or not the robot is walking;
    when it is determined the robot is walking, determining whether the robot is supported on both feet or one foot using foot sensors of the robot;
    when it is determined the robot is walking and is supported on both feet, carrying out posture-maintaining control;
    when it is determined the robot is walking and is supported on one foot, carrying out support control over a supporting leg based on gravity compensation and load compensation; and
    when it is determined the robot is walking and is supported on one foot, generating an imaginary repulsive force by which a swinging leg swings,
    wherein generating the imaginary repulsive force includes generating the imaginary repulsive force at a moment that the foot of the swinging leg leaves a ground in order to generate a repulsive force that helps one leg rise while controlling the other foot to support the robot,
    wherein determining whether or not the robot is walking is carried out using the foot sensors of the robot or encoders on joints of the robot,
    wherein carrying out the support control includes determining a walking speed using the foot sensors on the supporting leg, and
    wherein the generated imaginary repulsive force is a cosine function, with a magnitude thereof gradually decreasing from a maximum value when the repulsive force is applied.

2. The method of claim 1, wherein determining whether or not the robot is walking includes carrying out posture-maintaining control when it is determined the robot is not walking.

3. The method of claim 1, wherein generating the imaginary repulsive force includes controlling a stride or a moving speed of a tip of toes of the foot depending on the walking speed determined at the process of carrying out the support control.

4. The method of claim 1, wherein the foot sensors comprise a plurality of sensing elements which are continuously arranged in a lengthwise direction of the foot.

* * * * *